Nov. 21, 1939.   L. HARLESTON   2,180,901
CONTROL SYSTEM FOR PIPE LINES
Filed April 7, 1938   2 Sheets-Sheet 2

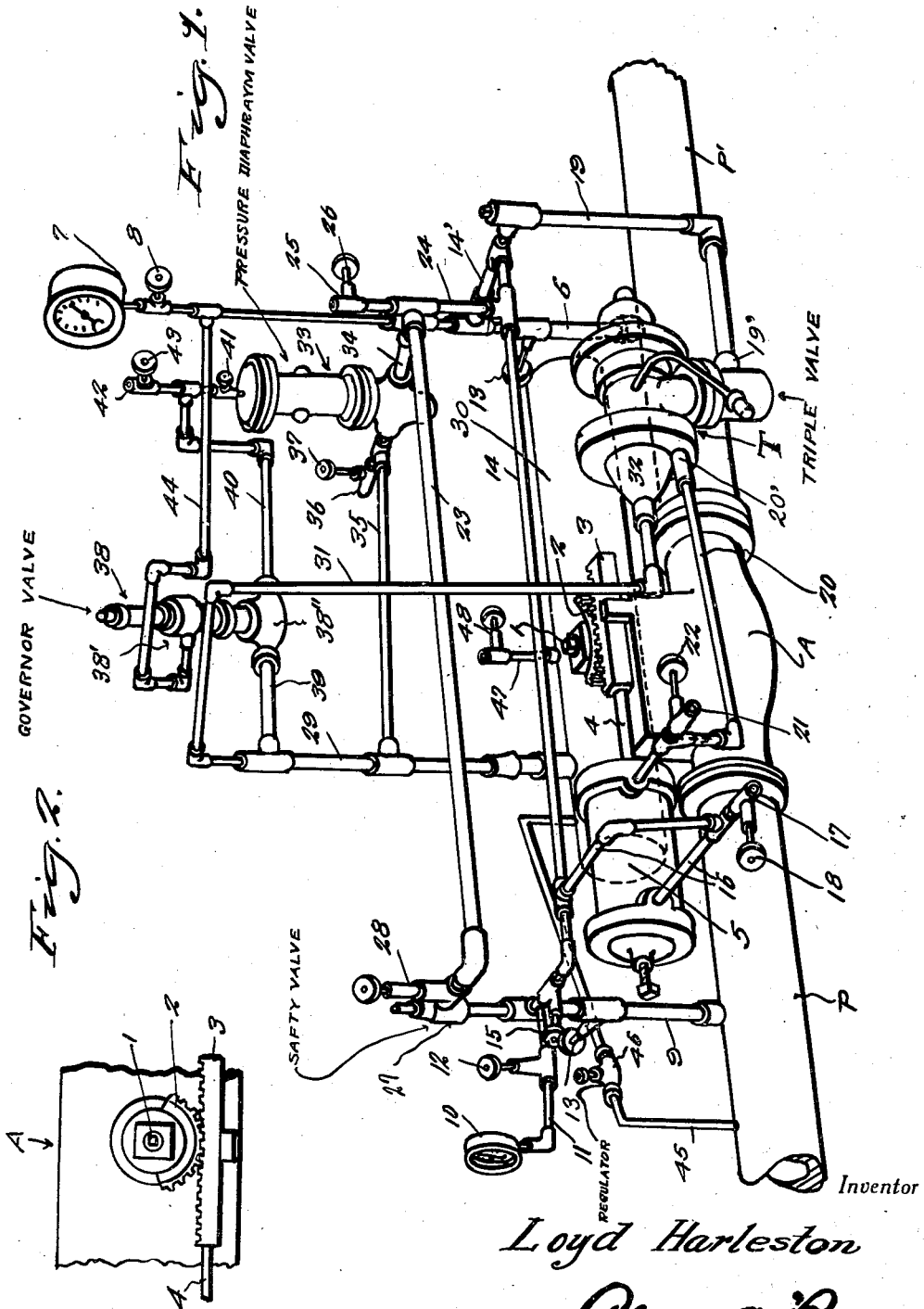

Inventor
Loyd Harleston

By Clarence A. O'Brien
and Hyman Berman
Attorneys

Patented Nov. 21, 1939

2,180,901

UNITED STATES PATENT OFFICE 2,180,901

CONTROL SYSTEM FOR PIPE LINES

Loyd Harleston, Baton Rouge, La.

Application April 7, 1938, Serial No. 200,780

5 Claims. (Cl. 137—153)

This invention relates to a control system for pipe lines, the general object of the invention being to provide means for closing the line if a break should occur therein, to release excessive pressure in a part of the line if a break should occur in the line and the pressure build up in another part thereof and to trap fluid in a line when the break occurs between the invention and the compressor station of the like.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a perspective view of the invention.

Figure 2 is a fragmentary top plan view showing the rack means for operating the master or main valve.

Figure 4:
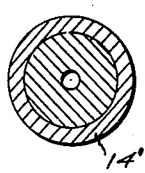
Figure 4 is a transverse sectional view through the choke pipe.
Figure 5:
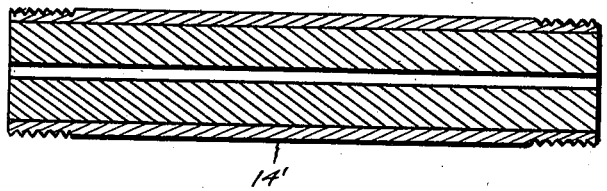
Figure 5 is a longitudinal sectional view through said choke pipe.

In these drawings the letter A indicates the master or main valve which is located between the up-stream section P and the down-stream section P' of the pipe line. This main valve has its interior member formed with a stem 1 which passes through suitable packing means in the valve casing and the stem carries a toothed gear or part 2 which is engaged by a rack bar 3 connected to a rod 4 which in turn is connected to a piston located in the cylinder 5 so that movement of the piston in the cylinder will open and close the valve. A vertically arranged pipe line 6 rises from the section P' and has a gauge 7 at its upper end, fluid to which is controlled by a valve 8 and a second vertically arranged pipe line 9 rises from the section P and has a gauge 10 in communication therewith through the pipe 11 which contains a valve 12. Both of the lines 6 and 9 contain the valves 13 adjacent their lower ends. A pipe line 14 connects the vertical members 6 and 9 together slightly above the valves 13 and this line contains a valve 15 adjacent its connection with the vertical member 9. Said pipe 14 is connected with the riser 6 by a choke pipe 14' which has a smaller bore than that of the pipe 14, as shown in Figures 4 and 5. A pipe line 16 connects the line 14 with one end of the cylinder 5, the fluid pressure from these parts moving the piston in said cylinder 5 in a direction so as to cause the rack means to open the main valve A. This line 16 is provided with a gauge connection part 17 controlled by a valve 18. A triple valve T has its inlet 19' connected by a pipe line 19 with that part of the line 14 which connects with the choke pipe 14' so that fluid will pass from the member 6 into the triple valve and a pipe line 20 connects the end of the cylinder, opposite the end to which the line 16 connects, with a port 20' of the triple valve. This line 20 is also provided with a gauge connection part 21 controlled by a valve 22. Thus when the fluid passes from the triple valve through the line 20 into the cylinder the piston in the cylinder will be moved to the left so as to close the main valve A. A pipe line 23 has one end connected to an upright part 24 leading from the right end of the line 14 and having a discharge and gauge connecting part 25 at its upper end controlled by a valve 26, the other end of the line 23 being connected with a safety valve 27 on the upper end of the member 9, a control valve 28 being located in the line 23 adjacent the point where it joins the safety valve. A vertical pipe line 29 rises from a tank 30 and a pipe line 31 connects the upper end of the line 29 with the port 32 of the triple valve T.

A pressure diaphragm valve 33 has its lower part connected by a pipe 34 with the vertical pipe line 6 above the connection of the choke pipe 14' with said line 6 and a pipe 35 connects the opposite side of the lower part of this valve 33 with an intermediate part of the vertical line 29. This pipe 35 connects to a gauge pipe 36 of the valve 33 which contains the control valve 37. A governor valve 38 has one side of its lower part 38'' connected by a pipe 39 with an upper portion of the vertical line 29 and the opposite side of the lower part of this valve 38 is connected by a pipe line 40 with the top of the pressure diaphragm valve 33, a valve 41 being located in the line 40 adjacent its connection with the top of the valve 33 and a gauge pipe 42 is connected with the line 40 above the valve 41 and contains a valve 43. The upper portion 38' of the governor valve 38 is connected by a pipe line 44 with the upper portion of the vertical line 6 below the valve 8. A pipe line 45 connects the main pipe P with the tank or reservoir 30 and contains a regulator valve 46 and the tank or reservoir has connected therewith a gauge pipe 47 controlled by a valve 48.

The governor valve 38, triple valve T, safety valve 27 and the pressure diaphragm valve 33 as well as the main valve A are of the usual or any desired construction and those shown are standard manufactured products.

Figure 6:
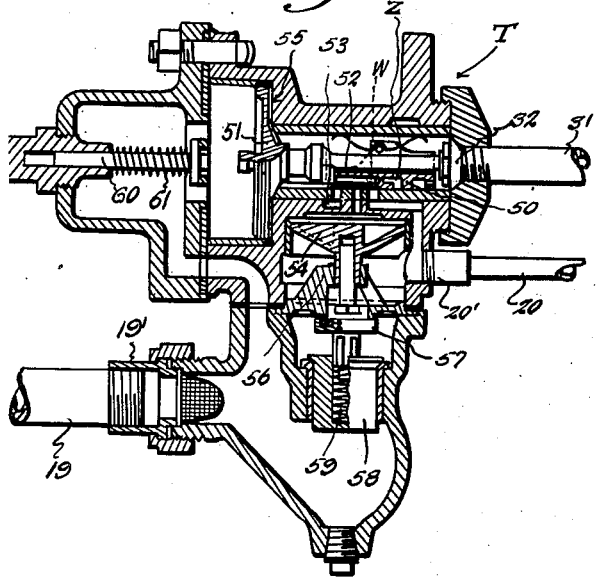
Figure 6 is a sectional view through the triple valve.

The triple valve is shown in section in Figure 6 and is of the usual construction so it is not thought necessary to describe the specific construction thereof. However, the major portions are described as follows. The slide valve is shown at 50 and is actuated by the stem of the main piston 51 which also controls the graduating valve 52 which controls the flow of air through service ports W and Z of the slide valve. The slide valve controls communication between pipe 20 and port 53 leading to the atmosphere, between the pipe 31 and port 32 and the pipe 20 and port 20' and also between the pipe 31 and port 32 and the chamber above emergency piston 54. The main piston 51 controls the feed grooves 55. The emergency valve seat is shown at 56 and the emergency valve at 57. A check valve is shown at 58 and its spring at 59. The graduating stem is shown at 60 and its spring at 61.

Figure 7:
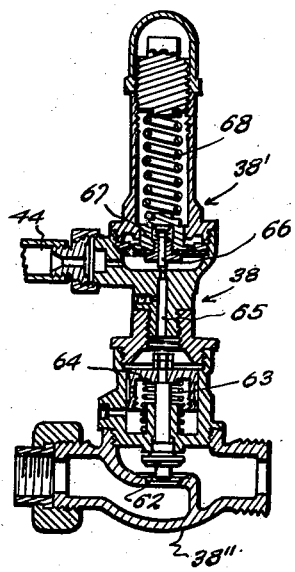
Figure 7 is a sectional view through the governor valve.

The governor valve is shown in Figure 7 and the valve in the lower part 38" thereof is shown at 62 and a spring 63 engaging the piston 64 connected with the stem of the valve, normally holds the valve in open position. A passage 65 leads from the upper part 38' of the valve to a point above the piston 64 and this passage is normally closed by means of a pin 66 carried by a diaphragm member 67 which is pressed downwardly by a spring 68. However, when air enters the space below the diaphragm member 67 through pipe 44 the diaphragm member is raised to lift the pin so that fluid can pass down the passage 65 and act upon the piston 64 to close the valve 62.

Figure 3:
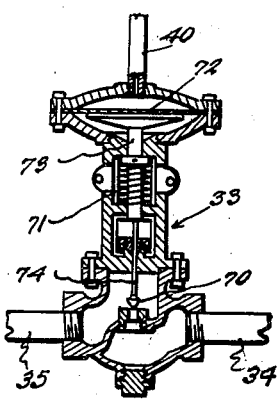
Figure 3 is a sectional view through the pressure diaphragm valve.

The pressure diaphragm valve is shown in section in Figure 3 and the valve for controlling the passage of fluid through the lower part thereof is shown at 70. This valve is normally held off the seat by a spring 71 but when fluid enters the top part of the pressure valve through pipe 40 the diaphragm 72 is depressed which causes the stem 73 to press downwardly upon the stem 74 to valve 70 so as to press said valve 70 upon its seat, thus closing communication between the pipes 35 and 34.

Of course, when the device is in operation all the valves for controlling the open gauge connections, as well as valve 15 are closed and with the fluid passing through the main line and there are no breaks in said line, pressure from the main line passing through the line 44 from the upper part of line 6 will lift diaphragm member 67 and pin 66 and some of the fluid will pass through the passage 65 and act upon the piston 64 and thus close the valve 62 so that no pressure can pass from the tank or reservoir or from any other part of the system through the line 40 into the upper portion of the pressure diaphragm valve 33 and thus the spring 71 will hold the valve 70 in open position and some of the fluid from the main line will pass through the line 14 and line 16 into the cylinder 5 and move the piston to the right, thus causing the rack means to hold the valve A in open position. Some of the fluid will pass into the triple valve through the line 19 and will flow past the main piston 51, through the grooves 55 and out of the port 32 into the line 31 and down the line 29 into the tank or reservoir 30. The reservoir is also connected to the line P' by means of the pipe 35, the lower part of the pressure diaphragm valve 33, pipe 34, and the lower part of riser 6.

If the pressure in the main line should drop below a predetermined minimum for any reason, such as a break in section P' of the main line, this minimum pressure in the part 38' of the governor valve 38 would permit the valve 62 in the lower section 38" of the valve 38 to open so that pressure from the reservoir or tank 30 would be permitted to pass through the lines 29 and 40 onto the head diaphragm 72 of the pressure diaphragm valve 33 which would close valve 70 in the lower section of said valve 33, thus blocking the passage of the gas from the reservoir to the main line. This would cause the pressure from the reservoir to pass through the lines 29 and 31, into the part 32 of the triple valve, which reverses the triple valve and permits pressure from the reservoir to pass from pipe 31, by the slide valve of the triple valve into line 20 to the right hand end of cylinder 5 which forces the piston in said cylinder to the left to close the main valve A. Pressure is released from the left hand end of the cylinder 5 through pipes 16, 14, 14' and 6 and through the break in pipe P'.

If the break is in the main line below the main valve and pressure should increase in the upstream section P, then when the pressure reaches a critical point or a predetermined point for which the safety valve 27 is set, then this increased pressure will open the safety valve 27 and the fluid passes into the line 23 and line 19 through the triple valve so that the parts of the triple valve are returned to the position shown in Figure 6, which connects the right hand end of cylinder 5 with the atmosphere by way of pipe 20 and the exhaust port 53 of the triple valve. Pipe 14' acts as a choke so that the fluid coming from the safety valve builds up against this choke and goes through pipe 19 into the triple valve to operate the parts thereof. Some of this fluid will pass through the line 14 and line 16 into the left hand end of cylinder 5 which causes the rack means to open the main valve, thus dumping the excess pressure into that part of the main line which has the break therein. In this case the device acts as a safety device to prevent excessive pressure in a part of the main line from causing damage. As soon as the pressure drops in said part of the main line, the safety valve 27 closes and then the pressure in the reservoir acts to close the main valve A in the same manner as above described, due to the fact that the down stream section is open by the break therein.

In order that the reservoir will always have sufficient fluid therein for closing the master valve after these safety valve openings, the small line 45 is provided for connecting the up-stream side of the main line to the reservoir, the regulator 46 permitting a small amount of fluid pressure to pass into the reservoir at all times.

In case the up-stream section of the main line should break, the dropping pressure at this point will also put the governor valve 38 into operation, thus causing the main valve A to close, in the same manner as if a down stream section had released the pressure. This prevents the gas in the down stream section of the main line from backing up and escaping through the break in the up-stream pressure.

The main valve A may be opened or closed at any time without a break occurring in the main line, by an operator creating false pressures. The normal position of the main valve A is, of course, the open one. Therefore, if the operator wishes to close this valve he would close the small valve 13 in riser 6 which would block the pressure from the main line. Then he would open valve 26 in the upper end of the line 24 to release the positive pressure in the triple valve, thus causing the triple valve to reverse so that the pressure from the reservoir will enter the triple valve through line 31 and part 32 and then the reservoir pressure would flow from the triple valve into line 20 and into the right hand end of the cylinder 5 which causes the rack means to close the main valve. When the main valve is to be opened the small valve 15 is opened or small valve 13 which will permit the pressure to enter the triple valve through the line 19 and the pressure will pass from the valve through the lines 31 and 29 into the reservoir which will take the pressure off the piston of the cylinder 5 at the right hand end thereof and applies the pressure in the cylinder at the left hand end of the piston and this, of course, opens the valve A.

As will be seen this control goes into operation when the pressure declines to a predetermined pressure which would only happen in case that a line breaks. This system automatically closes the main line on each side of the break, provided an installation of the invention is set at intervals along the pipe line if an installation of the invention is installed between the break and the source of pressure, such as a gas well or compressor station, the device would close the main valve in the pipe line and act as a block gate for the main line. In case the source of pressure continues to build up pressure in excess of the safety features of the line, then the small safety valve opens which in turn opens the master valve automatically and pumps the excess load through the pipe line. Thus in this case the device acts as a safety valve besides acting as a gate valve. Should the invention be below the break and the source of pressure, the invention would close and trap what gas or pressure is in the line below the invention and in this case it would act as a check valve also.

These devices are to be installed at predetermined distances on the main flow lines so that a break in the said lines between these points will operate these devices and thus block off the broken sections. As will be understood when pressure comes in the triple valve through the pipe 19 the fluid cannot come out of the triple into the pipe 20 but must pass from the triple valve through 32 and thus pass into the reservoir. Outlet 25 controlled by valve 26 serves as a gauge connection and also as an outlet to create a discharge of pressure to close the valve A without a break occurring in the flow line. The emergency features of the triple valve will come into operation when there is a tremendous drop or sudden drop in pressure in the flow line.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In an apparatus of the class described, a main line, a control valve in said line operative to open and close the same, valve operating mechanism including a cylinder and piston, the latter operative under pressure on opposite sides thereof to open and close said valve respectively, and means to operate said piston comprising a pressure tank, a supply line extending between the main line and said tank, a return line connecting the tank to said main line, a normally open cut-off valve in the return line for closing the same in the event of pressure failure in the main line, a cut-off valve control line connecting the tank with said cut-off valve, a governor valve interposed in the cut-off valve control line and operative under pressure failure in the main line to closing of the cut-off valve and thereby block the return line, a triple valve in the supply line operative under normal pressure in the main line to open the supply line, a constantly open control line for introducing pressure from the main line to one side of the piston, whereby the latter is operative in a direction to maintain the main valve open under normal pressure in the main line, a second control line from the triple valve to the opposite side of the piston and controlled by the triple valve to exhaust from said side of the piston under normal pressure in the main line, said triple valve being operated by pressure in the tank when the return line is closed to establish communication between said tank and the last-mentioned control line, whereby pressure is introduced to said opposite side of the piston to cause the same to operate the main valve to closing position.

2. In an apparatus of the class described, a main line, a control valve in said line operative to open and close the same, valve operating mechanism including a cylinder and piston, the latter operative under pressure on opposite sides thereof to open and close said valve respectively, and means to operate said piston comprising a pressure tank, a supply line extending between the main line and said tank, a return line connecting the tank to said main line, a normally open cut-off valve in the return line for closing the same in the event of pressure failure in the main line, a cut-off valve control line connecting the tank with said cut-off valve, a governor valve interposed in the cut-off valve control line and operative under pressure failure in the main line to closing of the cut-off valve and thereby block the return line, a triple valve in the supply line operative under normal pressure in the main line to open the supply line, a constantly open control line for introducing pressure from the main line to one side of the piston, whereby the latter is operative in a direction to maintain the main valve open under normal pressure in the main line, a second control line from the triple valve to the opposite side of the piston and controlled by the triple valve to exhaust from said side of the piston under normal pressure in the main line, said triple valve being operated by pressure in the tank when the return line is closed to establish communication between said tank and the last-mentioned control line, whereby pressure is introduced to said opposite side of the piston to cause the same to operate the main valve to closing position, a branch line having one end in communication with the main line in advance of the control valve of the main line and its other end connected to that part of the supply line leading to the triple valve and a safety valve in the last-mentioned branch line.

3. In an apparatus of the class described, a main line, a control valve in said line operative to open and close the same, valve operating mechanism including a cylinder and piston, the latter operative under pressure on opposite sides thereof to open and close said valve respectively, and means to operate said piston comprising a pressure tank, a supply line extending between the main line and said tank, a return line connecting the tank to said main line, a normally open cut-off valve in the return line for closing the same in the event of pressure failure in the main line, a cut-off valve control line connecting the tank with said cut-off valve, a governor valve interposed in the cut-off valve control line and operative under pressure failure in the main line to closing of the cut-off valve and thereby block the return line, a triple valve in the supply line operative under normal pressure in the main line to open the supply line, a constantly open control line for introducing pressure from the main line to one side of the piston, whereby the latter is operative in a direction to maintain the main valve open under normal pressure in the main line, a second control line from the triple valve to the opposite side of the piston and controlled by the triple valve to exhaust from said side of the piston under normal pressure in the main line, said triple valve being operated by pressure in the tank when the return line is closed to establish communication between said tank and the last-mentioned control line, whereby pressure is introduced to said opposite side of the piston to cause the same to operate the main valve to closing position, a branch line having one end in communication with the main line in advance of the control valve of the main line and its other end connected to that part of the supply line leading to the triple valve and a safety valve in the last-mentioned branch line, a pipe connecting the tank with the main line in advance of the control valve of the main line, and a regulator valve in the last-mentioned pipe.

4. In an apparatus of the class described, a main line, a control valve in said line operative to open and close the same, valve operating mechanism including a cylinder and piston, the latter operative under pressure on opposite sides thereof to open and close said valve respectively, a pair of pipes, one connected with the main line in front of the control valve thereof and the other with the main line in rear of said control valve, a tank, a pipe connected therewith, a return pipe connecting the reservoir pipe to the rear pipe connected with the main line, a normally open valve in the return pipe, pressure actuated means for closing said valve, a pipe leading from the tank pipe to the pressure means, a normally open valve in the last-mentioned pipe, pressure means for closing the last-mentioned valve, a line connecting the pressure means to the rear pipe for holding the valve closed by the pressure from the said rear pipe, a choke pipe connected with the rear pipe, a triple valve, a line connecting the outer end of the choke pipe with the main port of the triple valve and acting to hold the valve in release position by normal pressure from the main line, a line connecting the outer end of the choke pipe with the front pipe which is connected with the main line, a line connecting the said connecting line with one end of the cylinder for causing pressure from the main line to hold the piston in valve opening position, a valve in said connecting pipe adjacent its point of connection with the front pipe, a pipe connecting a second port of the triple valve with the other end of the cylinder for connecting said end of the cylinder with the atmosphere when the triple valve is in release position, a line connecting the third port of the triple valve with the tank pipe for supplying fluid to the reservoir from the main line when the triple valve is in release position, the tank pressure acting to reverse the triple valve when the valve in the return line is closed, whereby fluid is supplied to said end of the cylinder to cause the piston to close the valve in the main line.

5. In an apparatus of the class described, a main line, a control valve in said line operative to open and close the same, valve operating mechanism including a cylinder and piston, the latter operative under pressure on opposite sides thereof to open and close said valve respectively, a pair of pipes, one connected with the main line in front of the control valve thereof and the other with the main line in rear of said control valve, a tank, a pipe connected therewith, a return pipe connecting the reservoir pipe to the rear pipe connected with the main line, a normally open valve in the return pipe, pressure actuated means for closing said valve, a pipe leading from the tank pipe to the pressure means, a normally open valve in the last-mentioned pipe, pressure means for closing the last-mentioned valve, a line connecting the pressure means to the rear pipe for holding the valve closed by the pressure from the said rear pipe, a choke pipe connected with the rear pipe, a triple valve, a line connecting the outer end of the choke pipe with the main port of the triple valve and acting to hold the valve in release position by normal pressure from the main line, a line connecting the outer end of the choke pipe with the front pipe which is connected with the main line, a line connecting the main connecting line with one end of the cylinder for causing pressure from the main line to hold the piston in valve opening position, a valve in said connecting pipe adjacent its point of connection with the front pipe, a pipe connecting a second port of the triple valve with the other end of the cylinder for connecting said end of the cylinder with the atmosphere when the triple valve is in release position, a line connecting the third port of the triple valve with the tank pipe for supplying fluid to the reservoir from the main line when the triple valve is in release position, the tank pressure acting to reverse the triple valve when the valve in the return line is closed, whereby fluid is supplied to said end of the cylinder to cause the piston to close the valve in the main line, a safety valve connected with the front pipe, a line connecting the safety valve with the pipe which connects the choke pipe with the cylinder and a manually operated valve in a part of the pipe connected with the safety valve for opening said pipe to the atmosphere.

LOYD HARLESTON.